United States Patent [19]

Russell

[11] 4,128,835

[45] Dec. 5, 1978

[54] METHOD AND APPARATUS FOR MEASURING DISTANCE BETWEEN AN AIRCRAFT AND A GROUND STATION

[75] Inventor: James L. Russell, Germantown, Md.

[73] Assignee: Arinc Research Corporation, Annapolis, Md.

[21] Appl. No.: 874,480

[22] Filed: Feb. 2, 1978

Related U.S. Application Data

[63] Continuation-in-part of Ser. No. 827,009, Aug. 23, 1977, abandoned.

[51] Int. Cl.² ............................ G01S 9/04; G01S 9/56
[52] U.S. Cl. ............................. 343/6.5 LC; 343/6.5 R; 343/12 R
[58] Field of Search ............. 343/6.5 LC, 6.5 R, 12 R, 343/7.5

[56] References Cited

U.S. PATENT DOCUMENTS

| | | | |
|---|---|---|---|
| 3,530,467 | 9/1970 | Attwood et al. | 343/6.5 LC |
| 3,530,470 | 9/1970 | Sheftelman et al. | 343/6.5 LC |
| 3,900,873 | 8/1975 | Bouvier et al. | 343/12 R |
| 4,042,923 | 8/1977 | Merrick | 343/6.5 R |
| 4,072,946 | 2/1978 | Kneefel | 343/6.5 R |

Primary Examiner—Maynard R. Wilbur
Assistant Examiner—Lawrence Goodwin

[57] ABSTRACT

A distance measuring system is provided including a ground station transponder continuously transmitting a repeating pseudorandom coded bit pattern, and at least one aircraft interrogator receiving and locking onto the ground station signal. The aircraft interrogator transmits a coded interrogation signal in precise synchronism with an arbitrarily selected any one of the repetitive code words (bit patterns) that comprise the repeating pseudorandom coded bit pattern which are coded identically with the interrogation signal and waits for a reply. If the ground station receives the coded interrogation signal in synchronism with an identically coded word in its continuous transmission, it transmits a reply signal to the aircraft interrogator optionally encoded with synchronism error or interrogation steering information. If no reply is received by the aircraft interrogator, it transmits its next coded interrogation signal shifted by one or more bits relative to the arbitrarily selected received code word from the ground station. Successive interrogation signals are each shifted an additional predetermined number of bits until synchronism is attained and a reply signal is received. The number of bits of shifting performed by the aircraft needed for synchronization when combined with the number of bits representing the whole code word intervals elapsing between transmission of an interrogation and receipt of a reply represents the distance between the ground station and aircraft. The optionally encoded synchronism error and steering information is respectively utilized by the aircraft to more precisely calculate distance and alter its time of interrogation.

23 Claims, 13 Drawing Figures

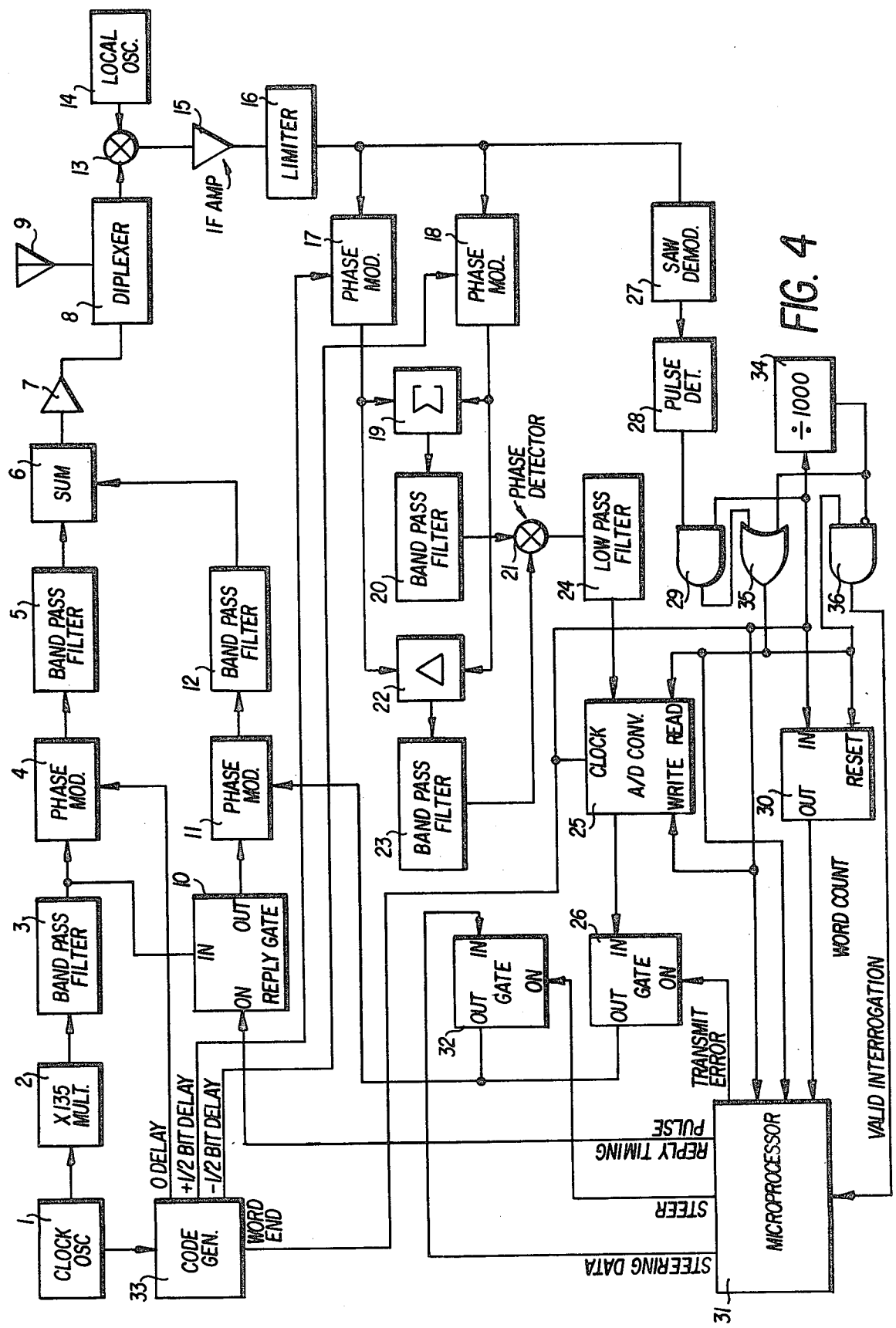

METHOD AND APPARATUS FOR MEASURING DISTANCE BETWEEN AN AIRCRAFT AND A GROUND STATION

This application is a continuation-in-part of Ser. No. 827,009, filed Aug. 23, 1977, now abandoned.

BACKGROUND OF THE INVENTION

The present invention relates generally to the field of measuring distance between two communicating stations and, more particularly, to the field of measuring distances between a moving aircraft and a stationary ground station.

There is currently provided an internationally accepted distance measuring system for use in an L-band frequency spectrum which can provide some measurement of distance between two communicating stations. However, the utility of this system is greatly limited because its distance measurement accuracy is inherently too poor to satisfy the evolving needs of military and civil aviation.

Additionally, some users of distance measuring equipment (DME) do not require greater accuracy than currently provided by the conventional system and wish to avoid the costs of any additional DME needed to provide greater accuracy. Most users do desire some degree of improvement in accuracy and indeed some users require accuracies which are well beyond the capability of any modifications which can be made to the conventional system while preserving its compliance with L-band frequency spectrum requirements.

Proposals for improving the distance measuring ability of the conventional system have included a "precision" L-band DME currently being tested as part of the Federal Aviation Administration National Microwave Landing System Program. However, this improved system is plagued by a relatively high cost. Another proposed system is described in Federal Aviation Association Document FAA-ER-700-08 as a "chirped" C-band DME for use with a microwave landing system (MLS). Again, users not requiring high accuracies have objected to the higher cost which they believe will be incurred from the utilization of techniques capable of achieving a high accuracy.

Further problems incurred with several of the proposed systems, in addition to their cost, are their power requirements and weight, which are both significant in aircraft installations.

SUMMARY OF THE INVENTION

Accordingly, an object of the present invention is to provide a highly accurate, low power, relatively inexpensive distance measuring system which may be used with a conventional microwave landing system (MLS) and which advantageously utilizes the coherent signal processing of pseudorandom coded ground and aircraft signal transmissions.

A further object of the invention is to provide a distance measuring system in which an airborne interrogator synchronizes with a predetermined code word in a continuously transmitted endlessly repeating coded bit pattern transmitted from the ground station and which acquires during the synchronization process information relating to the distance between the ground station and the aircraft interrogator which is used in a distance calculation.

An additional object of the invention is to provide the aircraft interrogator with a reply signal from the ground station indicating that approximate synchronism is achieved which may optionally be encoded with data either directing the time at which succeeding interrogation signals are to be transmitted from the aircraft interrogator or providing the aircraft interrogator with a synchronization error signal representative of the amount of synchronism error detected at the ground station between the received interrogation signals and the predetermined code word in the continuously transmitted endlessly repeating coded bit pattern.

Another object of the invention is to provide the aircraft interrogator with a reply signal which may be encoded to direct the time of its interrogations so that each will be received at the ground station in a time slot selected by the ground station for that particular aircraft interrogator.

These and other objects and advantages of the present invention will be apparent from the following detailed description of the invention which is read in conjunction with the accompanying drawings.

BRIEF DESCRIPTION OF THE DRAWINGS

FIG. 4 illustrates in block diagram format the ground station transponder;

DETAILED DESCRIPTION OF THE PREFERRED EMBODIMENTS

Figure 1:
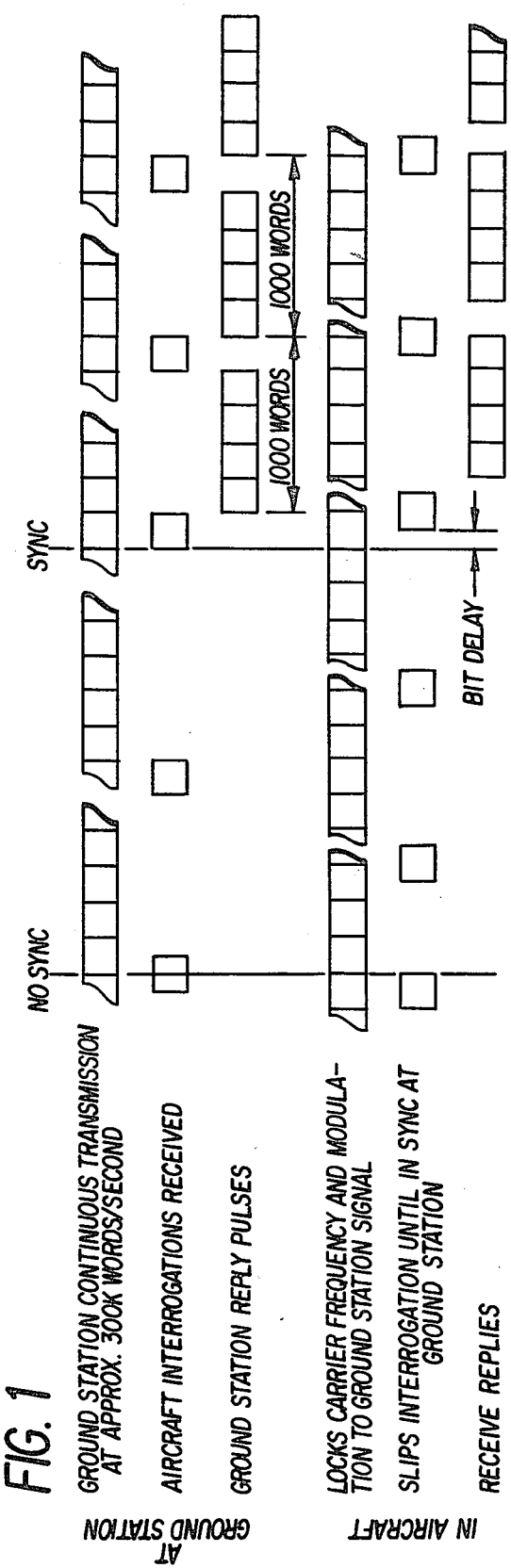
FIG. 1 illustrates the timed spacing between the coded ground station signals and aircraft interrogator signals utilized in the present invention.

The improved distance measuring system of the present invention uses coherent signal processing of pseudorandom coded ground and aircraft transmissions to provide a high accuracy in resolution with low base band bandwidth and low transmitted power. The system can be used with any frequency band where adequate channel width is available. However, this description assumes operation at C-band and system characteristics are quantified to be computed with that assumption.

The system uses both a ground station transponder and an aircraft interrogator. The ground transmissions consist of two types of serial code messages, a first being a continuous bit string pseudorandom code transmission which repeats endlessly at a predetermined word repetition rate (e.g., 300 khz). Although an endlessly repeating code transmission is used for illustration, any repetitive code word pattern may be used. The continuous code transmission phase reversal modulates a carrier wave and is received and processed in the receiver portion of the aircraft interrogator. A second transmission from the ground station consists of a reply signal also phase reversal modulating the carrier at the ground station which is transmitted in response to each received coded word interrogation signal being in synchronism with an identically coded word in the continuous endlessly repeating bit string. The coded interrogation signal is transmitted in synchronism with an arbitrarily selected any one of a number of repetitive identical code words in the received ground station continuous pseudorandom code transmission (which are coded identically to the interrogation signal). The reply signal is equal in length to four pseudorandom code words of the endlessly repeating ground station transmission and comprises four bits of information which may be encoded to form a data pulse for communicating information to the aircraft interrogator. That is, each bit of the reply signal is transmitted with its phase constant during an interval, which corresponds to an entire word bit string interval of the continuously generated pseudorandom code.

The aircraft interrogator locks onto the continuously generated ground station pseudorandom code signal and transmits an interrogation signal on an air-to-ground carrier frequency which is associated with the selected ground station assigned frequency channel. Usually this air-to-ground frequency is a fixed offset (e.g., 21.6 megahertz) above the ground/air frequency of the selected channel. Each coded interrogation signal transmitted from the aircraft interrogator consists of a carrier wave phase reveral modulated with a predetermined word in the ground station continuous transmission. The transmission of the coded interrogation signal by an airborne interrogator is precisely synchronized with an arbitrarily selected any one of a number of identical repetitive words in the continuous coded stream being received from the ground station which are identical to the predetermined word.

In order to simplify the description of the present invention, the endlessly repeating pseudorandom code from the ground station will be assumed to be 127 bits long, although this number is also purely exemplary; any code word selected from the family of maximal length pseudorandom codes can be utilized, i.e., those satisfying the relationship $2^n - 1$ where n is an integer. The predetermined ground station code word exists as any chosen 127 bit stream in the endlessly repeating pattern. Thus, the continuous bit stream transmitted by the ground station can be envisioned as a closed loop 127 bit code with a word therein starting at any bit location i which runs for 127 bits ending at the immediately preceding i-lth bit position and which has a word repetition interval of 127 bits.

The ground station monitors for an interrogation signal and if one is received in synchronism (defined as being within plus or minum 0.6 bit) with any identical word in its continuous transmission, a reply signal is then transmitted starting at the beginning of the second word interval following the received interrogation.

The interrogator, after entering the coverage zone of a ground station transponder and selecting the code and frequency assigned to that transponder, listens to determine if other interrogators are being served by the ground station. If other interrogators are being served, replies to them will be grouped in sequence near the beginning of each 1000-word repetition cycle of the endlessly repeating pseudorandom coded bit pattern. Although a 1000-word repetition cycle was chosen for illustration, other arbitrarily selected word repetition cycles can also be used. Thus, if no burst of replies is received by the newly arrived interrogator in a counted 1000 word interval, the interrogator deduces that the ground transponder is not occupied and a coded interrogation is transmitted coincident with an arbitrarily selected any one of a number of received identical words in the ground station transponder's continuous transmission which are identical to the predetermined code word utilized by the interrogator. If a burst of replies or a single reply to another aircraft is received in the 1000 word monitoring interval, the new interrogator must select a transmission time so that its interrogation will be recieved after the replies to other aircraft. This can be achieved by transmitting the first interrogation coincident with the last reply in a burst so that it will be received by the ground transponder in the quiet interval after it has replied to all the interrogators being served.

After transmitting an interrogation signal, the interrogator listens for a reply signal from the ground station during an interval which is equal to the two-way transmission delay which would be expected to be encountered for the maximum range of the system. That is, if the system is designed to operate over a 20 nautical mile distance, the interrogator will listen for a reply during an interval equal to the time period corresponding to a 40 nautical mile transmission. For purposes of illustration, a 75 word interval will the utilized in the description of the invention as the listen interval. If the aircraft transponder receives no reply during this 75 word interval, indicating lack of synchronism of its transmitted coded interrogation signal with the predetermined word in the upcoming endless bit stream at the ground station, it waits until a 1000 word interval has elapsed from time of its previous interrogation signal transmission and then transmits a subsequent interrogation signal shifted (advanced or delayed) by one or more bits relative to the 1000th received code word in the continuous ground station transmission. For the purposes of illustration and subsequent discussion, this subsequent interrogation signal will be the next interrogation of the aircraft and it will be delayed by one bit relative to the 1000th received code word. If the interrogator again fails to receive a reply within the next 75 word interval, an additional bit period is added to the interrogation delay time. Thus, each succeeding interrogation is delayed one additional bit more than 1000 words after the last interrogation until a reply is received from the ground station indicating that synchronism has been achieved. Once synchronism is obtained, successive interrogations will be spaced by exactly 1000 word intervals.

FIG. 1 illustrates the coded reply and interrogation signal structure and the timing between them. Each block represents a 127 bit pattern forming a word. As illustrated in the left most portion of FIG. 1, only interrogation signals and continuous ground transmission signals are present indicating that synchronism is yet to be achieved; however, as indicated in the right most portion of FIG. 1, once synchronism is obtained, a coded reply word is sent from the ground station to the aircraft transponder indicating this fact. Thereafter, each time an interrogation signal is transmitted to the ground station and received in synchronism with a word in its endlessly repeating code stream, a new reply signal is received back. As further indicated in FIG. 1, an initial interrogator transmission is out of sync with a received ground station code word, but when synchronism is finally obtained in the ground station, a whole number of bits of delay exist between the received ground station code word and the aircraft interrogation.

Figure 2:
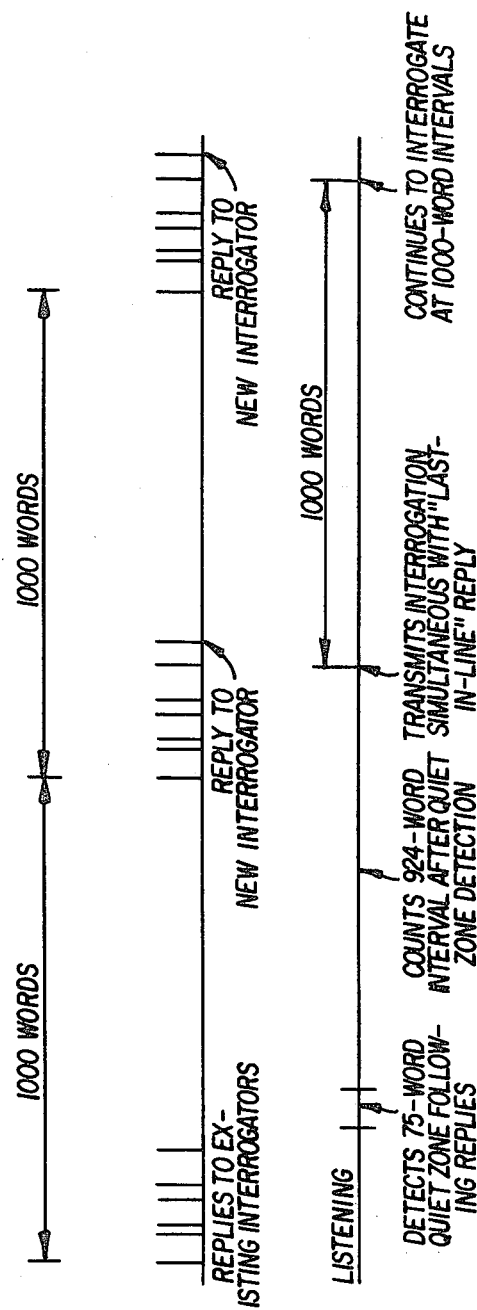
FIG. 2 illustrates the timed spacing of replies from a ground station to existing interrogations from aircraft and the timing intervals used by a new aircraft interrogator entering a ground station zone for detecting replies and formulating its interrogation signals.

FIG. 2 illustrates the signal timing for a new aircraft entering a given ground station coverage. As indicated in the bottom line graph, an entering aircraft listens for reply signals to existing interrogations, detects a 75 word quiet interval following replies, and transmits its own interrogation signal simultaneously with the reply signal to the last-in-line interrogation signal in the next 1000 word repetition interval.

While synchronization is being achieved between the aircraft interrogator and the ground station, a counter in the aircraft records the number of bits of delay which are required to achieve synchronism with the ground station. A second counter also located in the aircraft records the whole number of word intervals elasping between the last transmission of its interrogation signal and the reception of a reply signal from the ground station. The sum of the word count (converted to bits) in the second counter and the bit count in the first counter provides a measure of the range or distance between the ground station and the aircraft with an accuracy of ±1 bit. That is, the total number of bits of information counted between the interrogation signal and a reply signal is directly proportional to the distance, which can be calculated from this total bit value.

In addition, an accuracy of ±0.1 bit can be achieved if the reply signal is encoded with a four-bit data field indicating the sign and magnitude (in tenths of a bit) of the synchronism error measured by the ground station between the predetermined word in its code stream and the received interrogation coded with the predetermined word. It will be remembered that synchronism is indicated by the ground station when the received interrogation signal lies within ±0.6 bit of the predetermined code word. Thus, small errors may still exist even after synchronism has been obtained. When this error information is encoded on the reply signal and sent to the interrogator, it can be used in conjunction with the word count and bit count to provide a measure of the distance beween the ground station and the aircraft. Table I illustrates one coding format which may be used for encoding the amount of synchronism errors on the reply signal. Reply codes 0000, 0111, and 1111 represent optional steering code information which will be described below.

TABLE I

| Reply Code | Coding on Transponder Reply Pulses Meaning |
| --- | --- |
| 0000 | Advance interrogation 1 word |
| 0001 | +0.1 bit error |
| 0010 | +0.2 bit error |
| 0011 | +0.3 bit error |
| 0100 | +0.4 bit error |
| 0101 | +0.5 bit error |
| 0110 | +0.6 bit error |
| 0111 | Advance interrogation 10 words |
| 1000 | Zero error |
| 1001 | −0.1 bit error |
| 1010 | −0.2 bit error |
| 1011 | −0.3 bit error |
| 1100 | −0.4 bit error |
| 1101 | −0.5 bit error |
| 1110 | −0.6 bit error |
| 1111 | Advance interrogation 100 words |

Of course, since the distance measuring equipment is used in an aircraft system, motion of the aircraft will eventually cause the synchronism error value to reach ±0.6 error after synchronization is achieved, indicating that synchronization is no longer within ±0.5 bit. When this occurs, the encoded reply signal transmitted to the aircraft will indicate this condition and the aircraft interrogator will respond to it by advancing or retarding the next interrogation by one bit to regain a ±0.5 bit synchronism error limit. If the encoded reply signal indicates a +0.6 bit error the next interrogation will be advanced by one bit placing the synchronism error at −0.4 bit. If the encoded reply signal indicates a −0.6 bit error, the next interrogation is retarded by one bit placing the synchronism error at +0.4 bit.

After the first transmission by a new interrogator has been received by the ground transponder in synchronism with its continuous bit stream, the ground transponder could recognize that no other interrogators are being served and could simply transmit a reply signal starting two word intervals after the start of the received interrogation word. This reply would be encoded with the sync error code rather than the steering code information illustrated in Table I, the latter being used to direct a new interrogator into a time slot among a group of interrogators as further described below. However, in order to satsify the processing logic which computes steering data and which decides whether to select steering data or sync error data for transmission, a synthetic prior interrogation time marker will be generated in the ground station and used to mark the beginning of each reply interval. A first interrogator will have its transmission timing steered until it is received by ground station six word intervals after the synthetic interrotation. Subsequent interrogators will be steered so that their transmissions are received six words after the preceding interrogator signal.

The steering capability briefly discussed above is an additional aspect of the present invention which allows the ground station to direct compacting of interrogation signals from a plurality of aircraft and the replies thereto to achieve six word spacing between successive interrogations as received by the ground station and between successive replies. As noted above, the system can be initially designed to emit reply signals from the ground station to several interrogators at 75-word intervals. However, since only 13 aircraft can be accommodated (as a minimum in the selected 1000 word repetition interval, i.e., 75 × 13 = 975), a closer compacting of interrogations and, thus, reply signals is needed.

Figure 3:
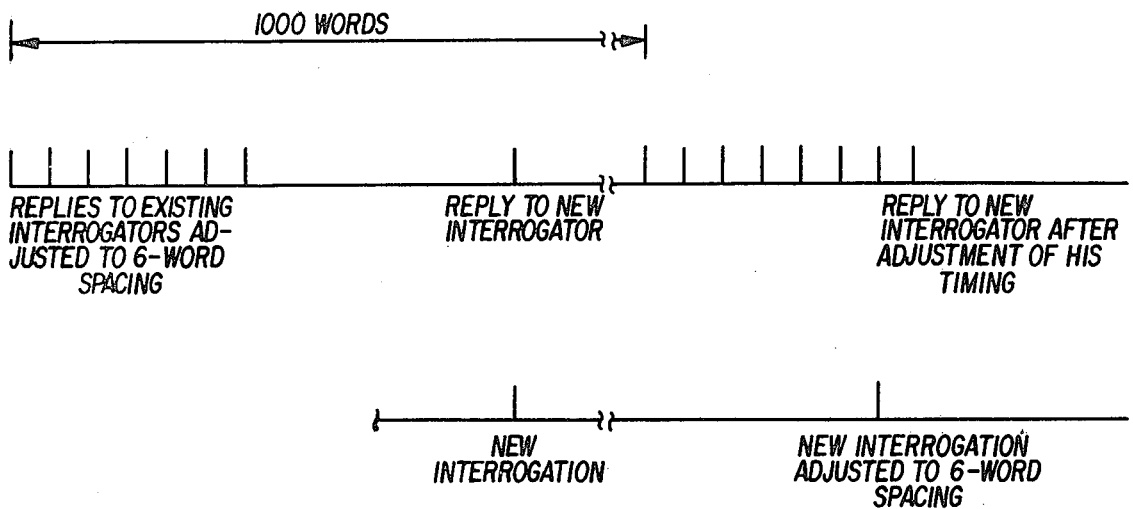
FIG. 3 illustrates the timing between replies to existing aircraft interrogations which have been adjusted to a six-word spacing interval and the timing of new interrogation signals from an aircraft newly entering the ground station zone.

FIG. 3 illustrates an optional compacting technique wherein ground station replies to several interrogating aircraft are spaced six code words apart. If a number of aircraft are already being served, the interrogation from a new aircraft would be received at some time not more than 75 words after the last in line of those already being served because a new aircraft will transmit its first interrogation at the time of the last in line reply. The ground station senses that the interrogation signal although synchronized with the predetermined code word in its endless bit stream transmission, is more than six code words removed from the previous interrogation received from a different aircraft and provides a reply signal encoded with a steering signal which instructs the new aircraft to advance its interrogation by, for example, 100 words, 10 words, or 1 word depending on how far removed the new interrogation was from the desired word spacing. This steering information is transmitted in lieu of the synchronism error information. As a result of these successive steering replies, the new aircraft will gradually advance its interrogation transmission time until the reply signal thereto will be spaced six code words from the immediately preceding reply to a different interrogator. As a result of this compacting technique, the ground station is capable of replying to 166 aircraft in each 1000 word repetition interval, i.e., 166 × 6 = 996. Table I also illustrates a suitable coding format for encoding the reply signal to convey steering information.

If no other interrogators are being served and a new aircraft sends an interrogation, the ground station uses the above described synthetic interrogation time marker (to which it does not reply) to provide a marker point for computing steering data to successive interrogations from the new aircraft.

Structures for implementing the system will now be described in detail with particular reference to FIGS. 4 thru 13.

A suitable ground station transponder will first be described in conjunction with FIG. 4. The continuous code stream transmission is derived from clock oscillator 1 whose frequency is selected to be exactly 1/135 of the assigned carrier frequency for the frequency channel utilized. The output from clock oscillator 1 is frequency multiplied by a factor of 135 in multiplier 2 to generate the desired carrier frequency. The multiplier 2 output is fed to band pass filter 3 which removes unwanted harmonics of the clock frequency and the filtered carrier signal is phase reversal modulated in phase modulator 4 by the endlessly repeating 127 bit pseudorandom binary code generated by code generator 33. The code generator 33 is more fully described with reference to FIG. 11.

Figure 11:
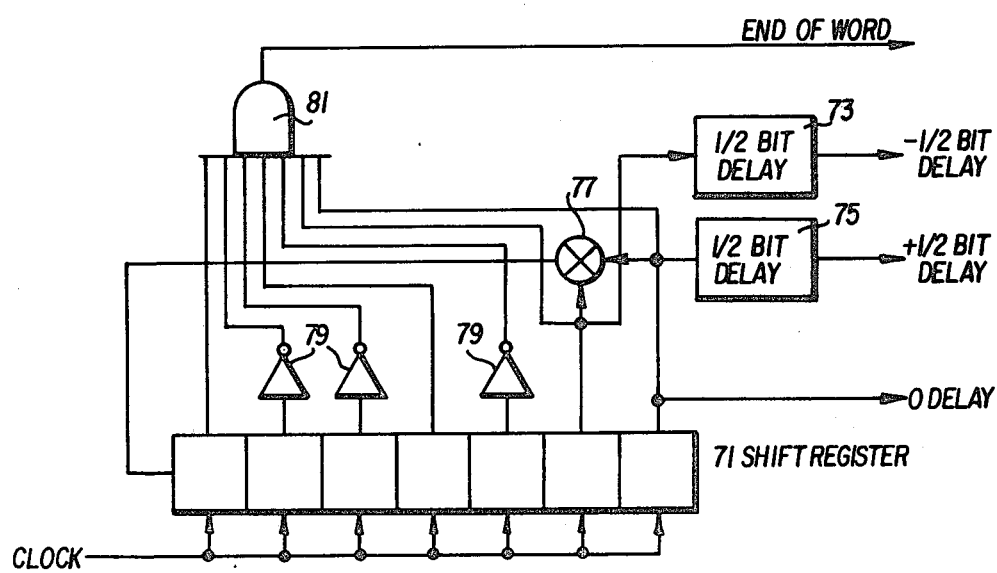
FIG. 11 illustrates a transponder code generator utilized in FIG. 4.

The transponder code generator 33 consists of a seven-stage shift register 71 which is initially loaded with a predetermined mined seven-bit code pattern which will lead to endless generation of the desired 127 bit code in successive 127 clock pulse cycles of shift register 71. Although any number of bits can be utilized in the endlessly generated ground station continuous transmission, 127 was selected so that the system can be conveniently accommodated in any of the frequency bands which may be used for the new Microwave Landing System. However, other bit stream length corresponding to maximal length pseudorandom codes can be used. The seven bits which are preloaded into shift register 71 are shifted with the two right most stages being continuously multiplied in multiplier 77 and fed back as an input to the shift register in accordance with shifting pulses fed in by the clock pulse line. A characteristic of shift register 71 as configured in FIG. 11 is that after 127 clock pulses its contents will be exactly the same as the start of the 127 clock pulses. AND gate 81 serves as an end of word detector and is wired either directly or indirectly through inverter circuits 79 to each of the stages of shift register 71. AND gate 81 detects the repetitive presence of a predetermined seven bit code in shift register 71 which occurs at the end of each 127 bit stream and supplies an output pulse indicating the end of a word. Half-bit delay circuits 73 and 75 are provided at the right most adjacent stages of the shift register to generate a $-\frac{1}{2}$ bit delay endlessly repeating code signal and a $+1/2$ bit delay endlessly repeating code signal, respectively, while a 0 bit delay signal is also taken off the stage at the right end of shift register 71.

Returning to FIG. 4, the 0 delay output of code generator 33 is connected to the phase modulator 4 to reverse phase modulate the carrier wave (i.e., a "1" is represented by one phase of the carrier, a "0" by a 180° change in that phase). The modulated carrier wave is filtered in band pass filter 5, fed to summing circuit 6, power amplifier 7, and diplexer 8 which channels the carrier signal to antenna 9. This continuously transmitted endlessly repeating code stream is transmitted independent of all other ground station transponder functions.

Reply signals are transmitted two word intervals after the start of each valid interrogation which is received (i.e., one word interval after the end of a valid interrogation) in order to provide a one word guard interval before and after each reply signal (assuming that the six word compacting will be used). The reply signal itself lasts for four word intervals, i.e., four 127 bit periods of the endless code with each of the four word intervals corresponding to a bit in the four bit reply signal. Microprocessor 31 determines whether each reply signal should be encoded with the synchronism error signals or with the steering commands illustrated in Table I to guide the interrogator towards an assigned time slot. Microprocessor 31 supplies a timing pulse to the reply gate 10 during the time a reply signal must be transmitted and turns on either gate 26 to supply synchronism error data or gate 32 to supply steering command data to phase modulator 11. The carrier frequency signal from filter 3 is passed by reply gate 10 to phase modulator 11 for the duration of the four bit reply signal. The binary code from either gate 26 or gate 32 is applied to the phase modulator to phase reversal modulate the carrier signal with the encoded data. The modulated carrier signal is filtered by band pass filter 12 and combined in summing circuit 6 with the continuous endlessly repeating generated code signal for transmission.

Interrogation signals are received by the ground station on antenna 9 and passed via diplexer 8 to the mixer 13. Local oscillator 14 supplies a reference signal which differs from the assigned air-to-ground carrier frequency for the ground station transponder channel by an amount equal to the receiver intermediate frequency. The resulting intermediate frequency signal from mixer 13 is fed through IF amplifier 15 and limiter 16 to phase modulators 17 and 18 which are respectively supplied with a $+\frac{1}{2}$ bit and $-\frac{1}{2}$ bit delayed versions of the endlessly repeating code generated by code generator 33. The phase modulators 17 and 18, summing amplifier 19, and band pass filter 20 serve to form a sum channel output which may take the values illustrated in FIG. 7 depending on the amount of correlation of the inputs to modulators 17 and 18. Differential amplifier 22 and band pass amplifier 23 form a difference channel output which also may take the values illustrated in FIG. 7. When the band pass filtered sum and the difference signals are fed to phase detector 21 and filtered by low pass filter 24, a DC pulse is generated having an amplitude and polarity corresponding to the amplitude and polarity of the difference channel output signal as defined in FIG. 7. Thus, if the received interrogation is using the correct code, and is synchronized within a ± 0.5 bit of any code word generated by the ground station, the output of filter 24 is the measure of the synchronism error existing between the received interrogation and the locally generated endlessly repeating continuous code stream. This error signal is applied to the analog-to-digital converter 25 for conversion to a four bit binary code which is stored therein when a pulse is simultaneously applied to the analog-to-digital converter 25 Read input. The digital signal is stored in analog-to-digital converter 25 until Write pulse causes it to be read out in serial fashion to gate 26. Synchronism errors greater than ± 0.5 bit are also detected by phase detector 21, however, then a ± 0.6 bit error is measured indicating that synchronism is being lost, the next encoded reply signal to the interrogator will so indicate, as further described below, and corrective action will be taken by the interrogator to regain synchronism.

The output from limiter 16 is also applied to demodulator 27 which is a surface acoustic wave (SAW) delay line with 127 taps (if a 127-bit code stream is used) with the tap outputs summed in correct phase to remove the phase reversals caused by the phase reversal modulation on the coded interrogation. The output of the demodulator will be, for a correctly coded reply, a sharp pulse with a rise time approximately equal to one bit interval of the pseudorandom code with the peak occurring just as the last bit of the received interrogation bit code enters completely into the demodulator. This peak is independent of the time of arrival of the interrogation. However, if it coincides with the end-of-word pulse from code generator 33, synchronism between the received interrogation and a word in the continuously transmitted code stream is indicated.

Figure 13:
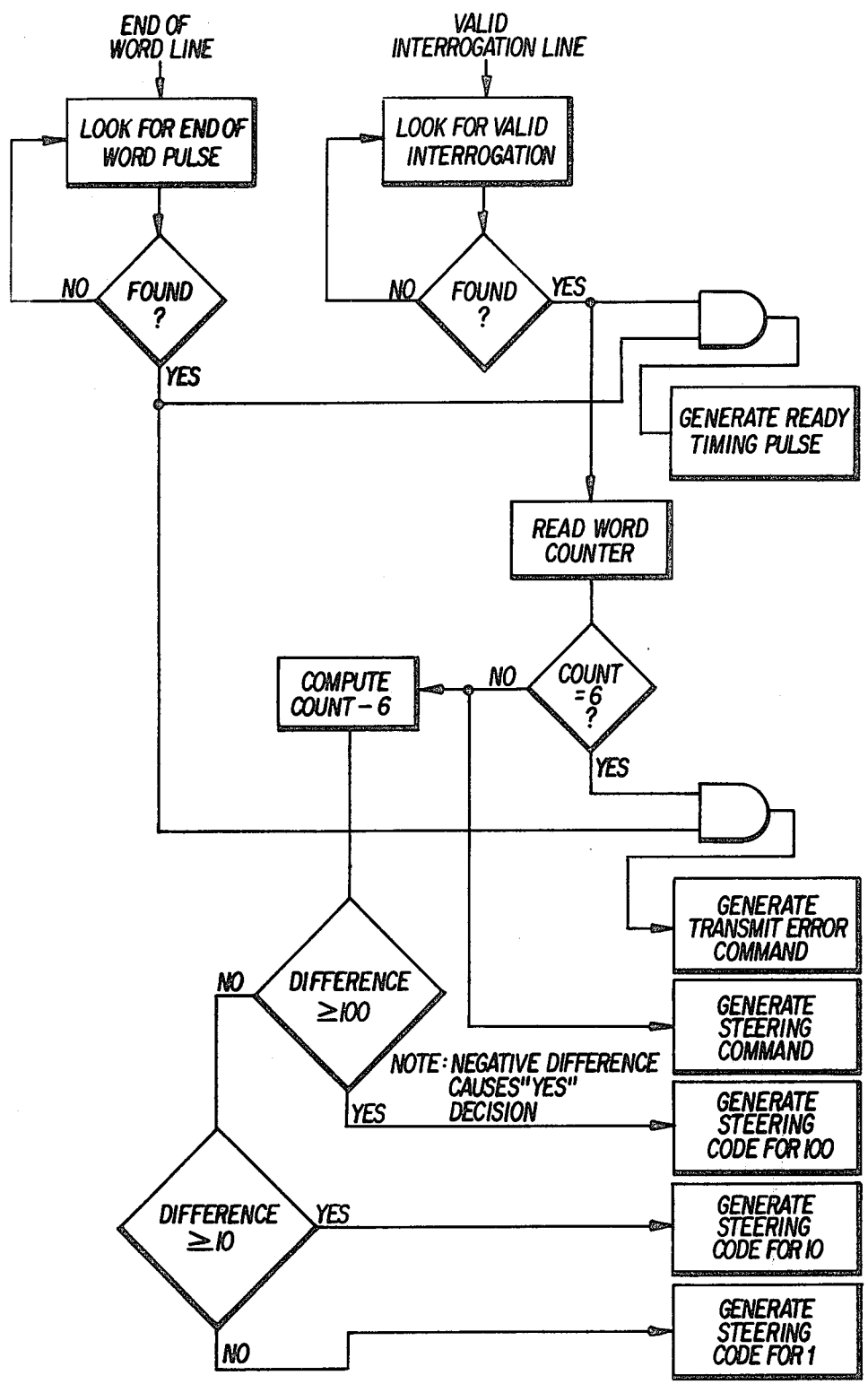
FIG. 13 illustrates in flow chart format the operations performed by the ground station transponder microprocessor.

The output of demodulator 27 is detected by pulse detector 28 and is applied as one input to AND gate 29 which forms the sync detector. The end-of-word pulse is applied to the other input of gate 29 which then produces an output whenever a correctly encoded interrogation signal correctly synchronized with an identical word in the continuous code stream is received. The output from gate 29 is applied through OR gate 35 to reset word counter 30 to zero and to the Read input of the analog-to-digital converter 25. Also applied to these points through OR gate 35 and directly to NOT AND gate 36 is a synthetic interrogation signal formed by divider 34 after each 1000 end-of-word pulses. In response to the simultaneous presence of a Read signal and the output from low pass filter 24, the analog-to-digital converter generates and stores a four bit code representing the amount of synchronism error between the received coded interrogation signal and the identical code word in the continuous ground transmission. Word counter 30 is also reset by the output of the gate 35 and begins to count words in accordance with the end-of-word signal applied to it from code generator 33. The count of the word counter 30 is sent to the microprocessor 31. Microprocessor 31 may be any one of a number of known microprocessors, e.g., INTEL 8080. If the count received by microprocessor 31 prior to receipt of a valid interrogator indication (not coincident with a synthetic interrogation as determined by gate 36) from gate 35 is not 6, as would be probable if the interrogation is the first from a new interrogator requesting service, the microprocessor computes the number of word intervals of correction needed to steer the next interrogation from the interrogating aircraft to a desired time slot and prepares a four bit binary steering code (Table I) to instruct the interrogator to advance its next interrogation pulse by 1, 10 or 100 word intervals. For example, if the word counter equals 70, the microprocessor will compute 70 − 6 = 64 and formulate (i.e., look up in memory) the steering code 0111 to instruct the interrogator to advance its next interrogation by 10 words. The microprocessor 31, upon formulating the steering code also turns on gate 32 and holds off gate 26. It is also programmed to generate a reply timing pulse which begins with the first end-of-word pulse following a valid interrogation pulse emitted from gate 29. This will occur at the end of the work interval immediately following the receipt of the end of a valid interrogation. The reply timing pulse turns on a reply gate 10 so that a reply pulse can be transmitted during an interval corresponding to four word intervals of the 127 bit endless code stream following which the reply timing pulse ends and gate 10 opens. Simultanneously, the end of word pulse is applied to the Write input of analog-to-digital converter 25 causing the data stored therein to be read out in serial fashion. If a steering command is needed, as determined by the count in word counter 30, the microprocessor starts readout of the calculated steering command. However, if no steering command is needed (i.e., word counter 30 equals 6) synchronism error signals will be transmitted via gate 26. Whichever of gates 26 or 32 is opened will serially pass the digital information applied to its input to the modulating input of phase modulator 11 so that the necessary data will be encoded on the transmitted reply signal. FIG. 13 illustrates in flow chart format the above described functions performed by microprocessor 31. Recapitulating, if the microprocessor determines after a valid interrogation is received that the word count stored in counter 30 equals 6, then it generates a transmit error pulse to cause the transmission of synchronism error information through gate 26 to the interrogating aircraft. Also outputted is the reply timing pulse for opening reply gate 10. However, if the word count is not 6, a difference is computed between 6 and the count in counter 30 which is utilized to formulate the output steering code which will tell the interrogating aircraft to advance its interrogation by 1, 10 or 100 words. Also outputted is the needed steer gating signal and the reply timing pulse.

A synthetic interrogation signal is generated by divider 34 by each 1000th end of word pulse. When a new interrogator enters a ground station which is not serving other interrogators, it is steered to a time slot six word intervals after the synthetic interrogation signal. Other interrogators, as they request service, are arranged in order after the first so that the synthetic interrogation signal always marks the beginning of an interrogation cycle.

Figure 7:
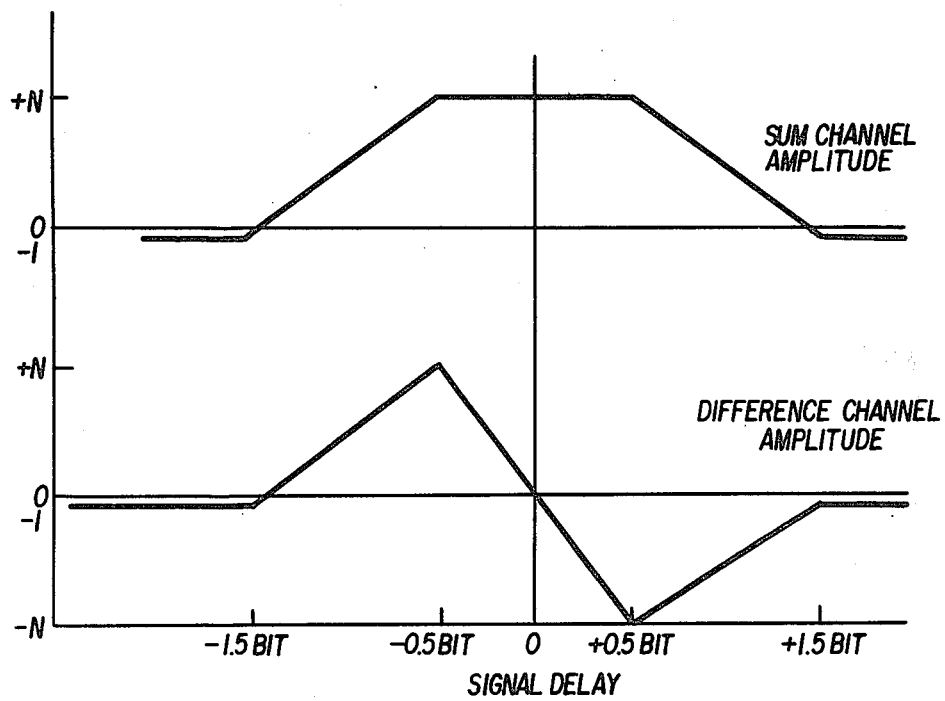
FIG. 7 illustrates the signal outputs from the sum and difference channels of the demodulator of FIG. 6.
Figure 5:
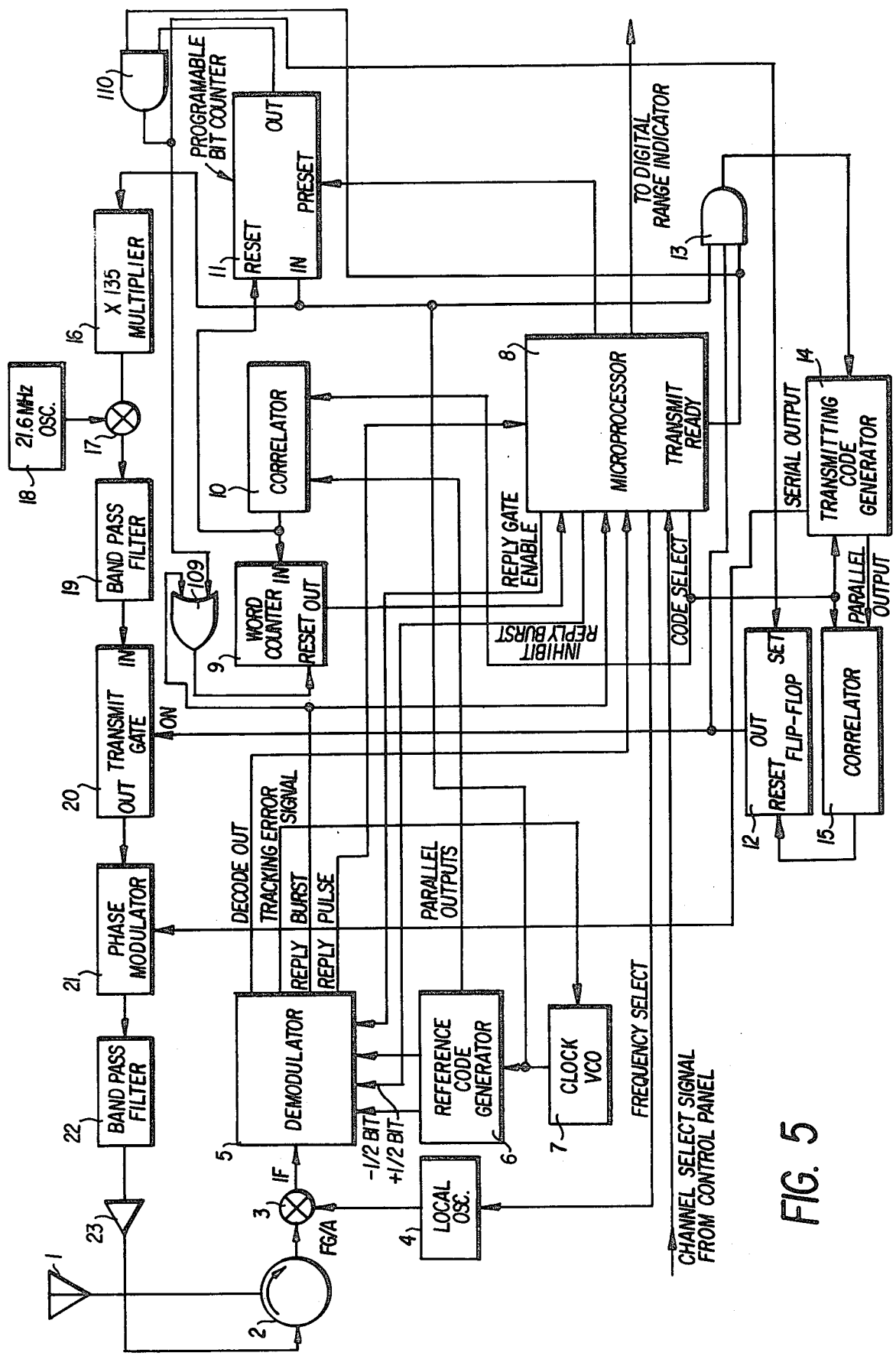
FIG. 5 illustrates in block diagram format the airborne interrogator.
Figure 6:
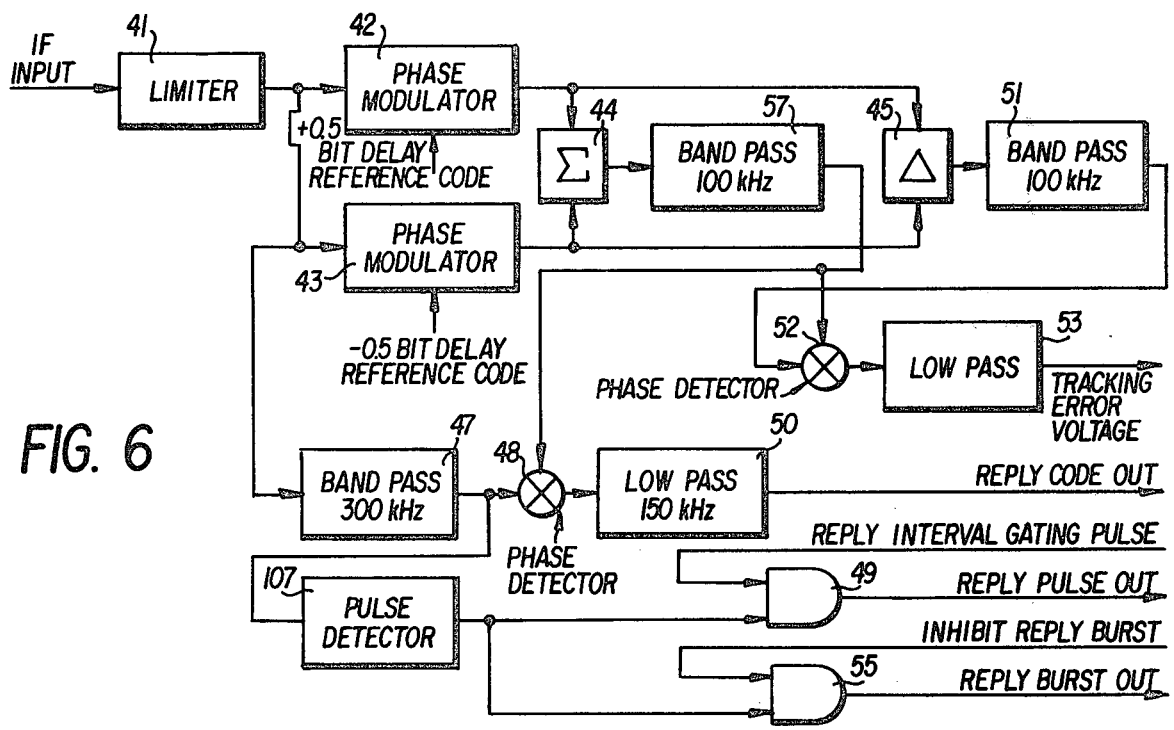
FIG. 6 illustrates the demodulator utilized in the airborne interrogator of FIG. 5.
Figure 8:
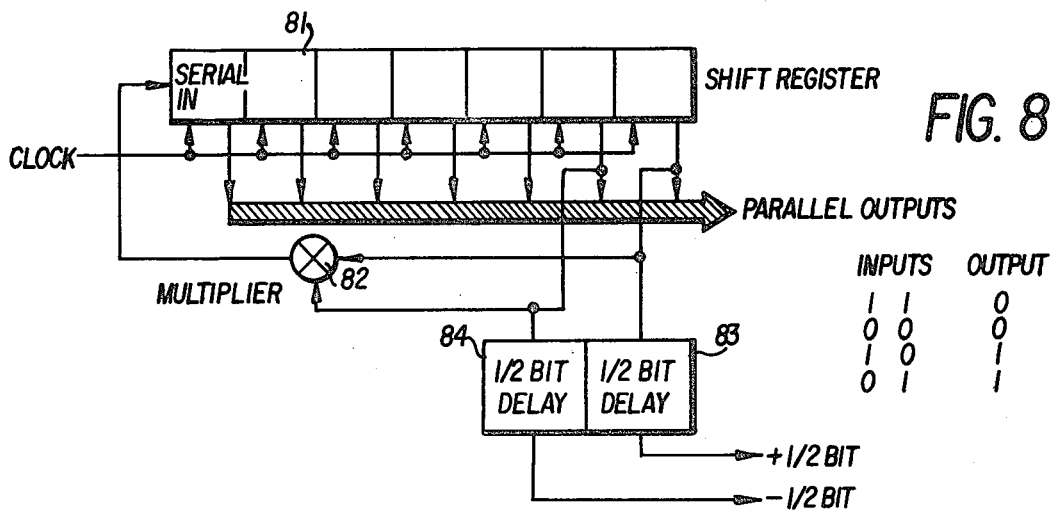
FIG. 8 illustrates a reference code generator suitable for use in FIG. 4.
Figure 9:
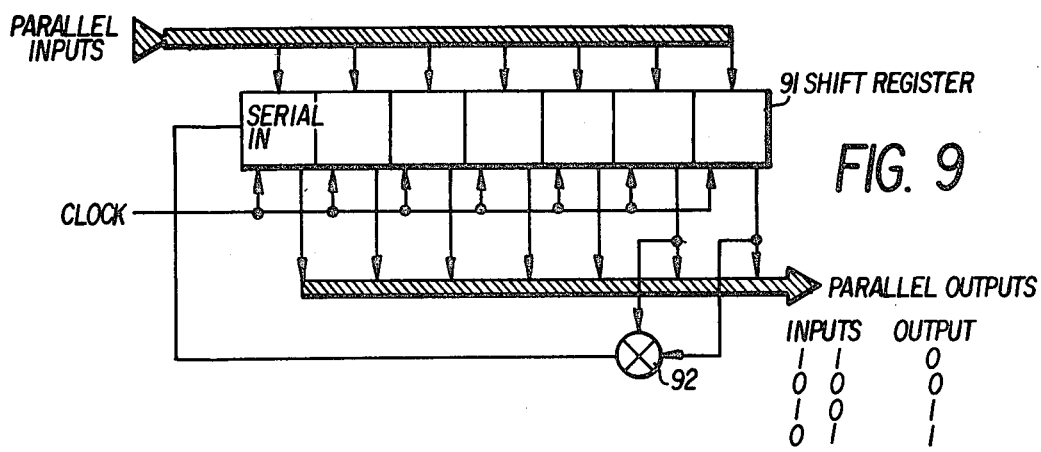
FIG. 9 illustrates a transmitting code generator which may be utilized in the airborne interrogator of FIG. 5.
Figure 10:
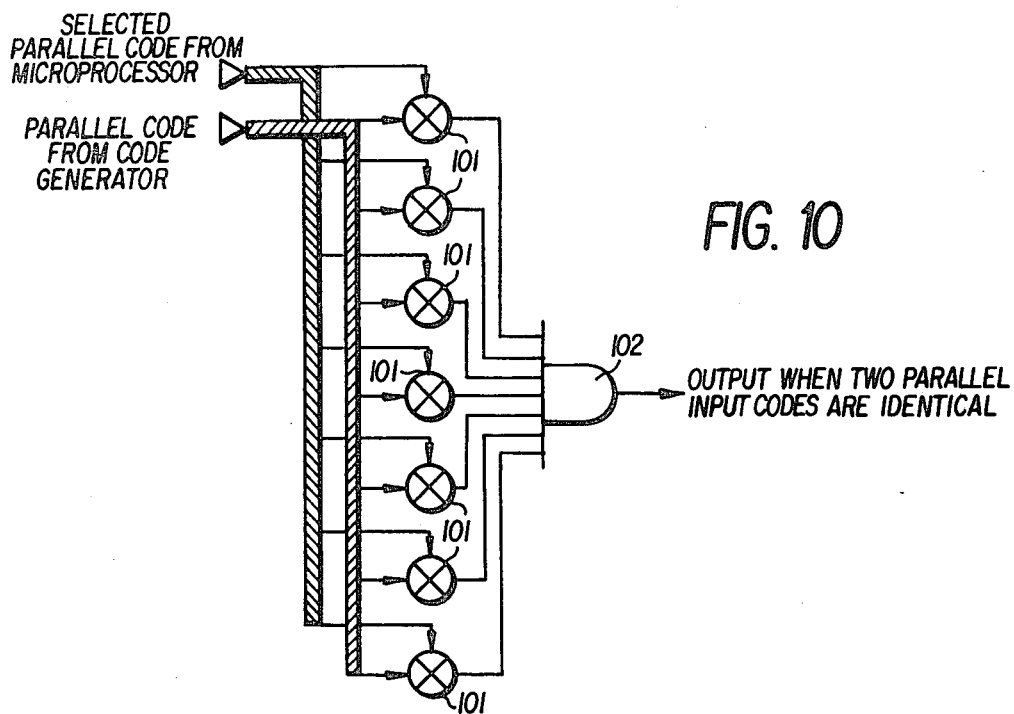
FIG. 10 illustrates a correlator which may be used in the airborne interrogator of FIG. 5.

The airborne interrogator will now be described with particular reference to FIG. 5. After determining the numbered channel used by a desired ground station, an aircraft operator will set the channel selection control switch on the control panel of the avionics interrogator to the selected channel number. This channel selection signal is applied to a microprocessor 8 which looks up in a stored memory the particular code sequence and the particular frequency corresponding to the selected channel. The frequency is read out and generated as a frequency command to local oscillator 4 causing the local oscillator 4 to generate a frequency which will mix with signals from a desired ground station transponder and produce the correct intermediate frequency for the interrogator receiver. Signals received from a ground station operating on the selected channel are received by antenna 1, passed by circulator 2 to a mixer 3 and there converted to an IF frequency which demodulator 5 can accept. FIG. 6 shows the demodulator circuitry in greater detail, while FIG. 7 shows the sum and difference channel outputs which may be produced by that circuitry in response to the continuous endlessly repeating code stream in the received ground station transponder signal. The IF signal applied to the demodulator 5 is first fed through limiter 41 and then concurrently to phase modulators 42 and 43 which are also respectively fed with $\pm\frac{1}{2}$ bit delayed versions of a locally generated endlessly repeating code signal pattern corresponding to that transmitted by the ground station. The $\pm\frac{1}{2}$ bit delayed code signals come from reference code generator 6 which is similar to the ground station code transmitter and which is more fully illustrated in FIG. 8 as comprising shift register 81, $\pm\frac{1}{2}$ bit delays 83 and 84 and multiplier 82. The outputs of phase modulators 42 and 43 are in turn summed by summing amplifier 44 and subtracted by differential amplifier 45. The received code stream is also passed through bond pass filter 47 and fed to phase detector 48 as well as through phase detector 107, to AND gates 49 and 55. The output from summing amplifier 44 which passes through bandpass filter 57 is utilized as a phase reference signal in two separate phase detectors 48 and 52. Phase detector 52 is in the tracking loop for the received code stream while phase detector 48 functions as the reply signal decoder. The output from the differential amplifier 45 is filtered by band pass filter 51 and is applied to a phase detector 52. This phase detector 52 receives and transforms the difference channel IF signal shown in FIG. 7 to a DC error voltage which is applied to the voltage controlled clock oscillator 7 in FIG. 6 to control its frequency such that the received code stream and the zero-delay continuous code from reference code generator 6 are exactly synchronized with the continuously received code. Once the tracking loop has stabilized, each reply signal transmitted by the ground station transponder will generate a reply signal in the aircraft demodulator. The reply signal phase detector 48 (FIG. 6) will generate a "one" signal when the reply phase is the same as for the "one" state of the continuous code stream and a "zero" signal when the reply phase is the same as the continuous code "zero" state. The decoded output of the demodulator will contain the binary information which was encoded on the reply signal, i.e., either steering commands or measures of synchronism errors. Thus, the outputs of the demodulator consists of the encoded reply message on the output of low pass filter 50, a reply pulse taken from gate 49 which is timely energized by the microprocessor 8 when looking for a reply pulse in response to the aircraft's own interrogation signal, and a reply burst output signal which contains all of the replies to all of the other aircraft interrogators communicating with the ground station.

Each of the reply pulses, if any, are applied to the microprocessor 8, as is the decoded binary information from a reply signal. The microprocessor is programmed, in the absence of a reply pulse, to begin transmission of a coded interrogation signal coincident with and identical to an arbitrarily selected any one of the repetitive code words in the continuously received code stream. This arbitrarily selected code word will begin, as indicated previously, at an ith position as determined by the channel selected by the aircraft and end of the i-lth following bit position. If reply pulses are present, due to the ground station transmitting signals to other interrogators, they will be grouped in bursts in the leading portion of each 1000 word reply interval, with spacing between replies not exceeding more than 75 words. Of course, when the ground station is packing interrogations to achieve six word spacing intervals, replies will be received in a burst with like six word spacings. Word counter 9 in FIG. 5 is reset to zero by the output of OR gate 109 activated either by each reply pulse in the burst or by the transmit initiate pulse from counter 11 and the transmit ready pulse through AND gate 110. Counter 9 is also reset when its count reaches the binary equivalent of 1000.

At the beginning of ground station acquisition all circuits in the airborne interrogator are initialized to a zero state and microprocessor 8 is programmed to generate a transmit ready pulse when the count from counter 9 reaches a 1000 after having reached 75 without a reply pulse having been received. This transmit ready pulse is applied as one of the inputs to gate 13.

The channel select signal inputted to microprocessor 8 also causes the microprocessor to generate (i.e., look up in memory a code signal corresponding to the selected channel. This code signal is in the form of a 7 bit code which must be in the aircraft's transmitting code generator 14 shift register at the time it starts to produce the 127 bit code word to which the selected ground station will respond. That is, the seven bit code word inputted into reference code generator 6 corresponds to an identical 7 bit code word which is detected by AND gate 81 (FIG. 11) in code generator 33 at the ground station.

The seven bit code word applied to preset transmitting code generator 14 (better illustrated in FIG. 9) from the microprocessor is also applied as inputs to correlators 10 and 15. The transmitting code generator contains a 7 bit shaft register 91 and it is also arranged to output the 127 bit pseudorandom code defined by its 7 bit input and the operation of multiplier 92. Correlators 10 and 15 are further illustrated in FIG. 10 and comprise a plurality of coincidence gates 101 and a coincidence gate 102. When both sets of inputs to the correlators are equal an output signal is generated.

After channel selection and consequent entry of the 7 bit codes into correlators 10 and 15 and the code generator 14, a bit delay store in the microprocessor is set at zero and this value is entered into programmable bit counter 11. As the reference code generator 6 generates its serial bit stream output, which is precisely synchronized with the upcoming transponder bit stream, its parallel output will at some point in time become equal to the selected 7 bit code word stored in correlator 10 just as that part of the received continuous code stream corresponding to the selected code word begins. Correlator 10 will recognize the match and generate an output which is applied as an input to the word counter 9. This output occurs once for each cycle of the output from the reference code generator 6 and serves as the word rate clock required by word counter 9. The selected word pulse from correlator 10 is also applied to reset the programmable bit counter 11 to zero. Counter 11 counts bits in response to a clock input from clock VCO 7 and is designed to provide an output pulse whenever its count equals a preset value; thus, if it is preset to zero and a reset pulse returns it to zero, an output will be produced. The output pulse from the programmable bit counter is in turn applied to set flip-flop 12. As a result of being set, flip-flop 12 applied a transmit gate pulse to the transmit gate 20 and also an input gating signal to gate 13. Since gate 13 also has applied to it the transmit ready pulse, each clock pulse received on the remaining gate 13 input causes an output pulse which is applied as a clock pulse to transmitting code generator 14. The serial code output from code generator 14 is applied to pulse modulator 21 to reverse phase modulate the interrogation pulse with the desired code. The parallel outputs from transmitting code generator 14 are also applied to a correlator 15 for comparison with the selected 7 bit code from the microprocessor 8. After 127 pulses from gate 13 have been generated, an entire desired predetermined code word will have been transmitted and the code generator 14 will return to its preset condition as set by the microprocessor code select signal. This will result in a corresponding parallel output to correlator 15 identical to the code stored in correlator 15 resulting in the generation of an output signal by correlator 15 which resets flip-flop 12 to the off position, thereby opening transmit gate 20 and disabling one input to gate 13 which in turn no longer supplied clock pulses to transmit code generator 14.

If after initially selecting a frequency channel and ground station code no reply burst has been received after a period of 1000 words, the first interrogation signal containing a predetermined 127 bit code pattern is transmitted in synchronism with the 1001th word in the upcoming continuous code stream. If, on the other hand, a reply burst (one or more reply pulses to interrogations by other aircraft) is received before the count reaches 75, the counter will be reset by each such pulse until the last in line is received. Thereafter, it will count until it reaches 75, indicating that the last in line has been reached. This causes an inhibit pulse to be generated by the microprocessor 8 which opens gate 55 in the demodulator and prevents generation of the reply burst until the inhibit pulse is terminated by the word counter reaching 1000. At that time, a transmit ready pulse will be sent to gate 13 at a time 1000 words after receipt of the last in line reply as illustrated in FIG. 2. An interrogation will then begin after counter 11 (FIG. 5) counts through the number of bits stored therein.

The air-to-ground carrier frequency of the transmitted code word is determined by multiplying the clock frequency by 135 in frequency multiplier 16 and adding to it the 21.6 megahertz of set frequency generated by oscillator 18 in mixer 17. The reverse phase modulated signal from phase modulator 21 is filtered by band pass filter 22, amplified by power amplifier 23 and applied to antenna 1 through a circulator 2.

After each interrogation, if no replies have been received, the microprocessor waits a time interval equivalent to 75 words for a reply signal to its interrogation. The reply gate enable output enables gate 49 at the beginning of an interrogation holding it open for 75 words intervals. If no reply signal is received, the bit delay stored in microprocessor 8 is incremented by one and the total stored bit delay fed to counter 11. As noted, counter 11 produces an output only when its count pulse equals the preset value. Since it is reset by each start-of-word pulse from correlator 10, the output pulse to turn on flip-flop 12 lies one bit behind the output pulse from correlator 10 for each unanswered interrogation. After a number of such incremental bit delays, the interrogation will eventually reach the transponder in synchronism with the code stream locally generated at the ground station transponder and cause a replay signal to be generated. Since counter 9 is reset by each transmission of an interrogation pulse, the count from counter 9 when the reply signal to a particular interrogation is received will be equal to the number of whole word intervals between transmission and reply. This whole word value is stored in the microprocessor and updated after each reply signal. Steering commands or synchronism error signals decoded from the reply signal are also stored and updated by the microprocessor 8 after each reply signal is received.

After the first reply signal is received and as long as reply signals continue to be received, the bit delay stored in the microprocessor 8 is not incremented, nor is counter 11 incremented except as required by the synchronism error signal reaching $\pm 0.6$ bit to compensate for range changes. An interrogation signal is thereafter transmitted by a delay equal to the number of bits stored by the preset input to counter 11 after each 1000th count from counter 9.

If the interrogation signal received from a given aircraft at the ground station transponder occurs more than 6 coded word intervals after a preceding received interrogation from another aircraft, the reply signal to the given aircraft is preferably encoded with instructions to advance the next interrogating transmission time by 1, 10 or 100 word intervals as appropriately determined by the ground station in order to have the interrogating signals from a plurality of aircraft conform to a desired six word interval spacing. The steering information encoded on the reply signal, e.g., 1, 10 or 100, is subtracted from 1000 to determine the count from counter 9 which will be required to initiate a new interrogation signal. Whenever the synchronism error coding indicates an error of $\pm 0.6$ bit, microprocessor 8 increments its bit delay store by 1 in a direction to reverse the sign of the indicated error. That is, if the indicated error is $\pm 0.6$ bit (late), the bit delay store will be decremented by 1, while if the error is $-0.6$ bit (early) the store will be incremented by 1 bit. This information is then sent to preset counter 11 accordingly. After reply signals are received and a given aircraft interrogator placed in its proper time interval corresponding to a six word interval spacing between interrogators, the time interval in which the given aircraft accepts a reply pulse as a reply to its own interrogation is restricted by narrowing the reply gate enable signal from a duration after interrogation corresponding to 75 word intervals to a duration corresponding to six word intervals starting Y word intervals after interrogation where Y is the count in counter 9 when a reply to an aircraft's own interrogation is received.

A numerical value for the range existing between a ground station and an aircraft is calculated by multiplying two less than the number of word intervals between an interrogation signal and the corresponding reply stored in the word delay store of microprocessor 8 (corresponding to the count received from word counter 9) by 127, (for a 127 bit word), and substracting therefrom the value stored in the bit delay store of the microprocessor 8 and further adding the synchronism error fractional bit values stored in the microprocessor 8 which have been received from the reply signal of the ground station, multiplying the added bit values by the time duration of a bit, and multiplying this quantity again by the velocity of propagation of the bit stream. Since the aircraft transponder clock frequency is always 1/135th of its channel frequency, the exact clock frequency differs for each frequency channel. Thus, the microprocessor is programmed to look up in a table or to calculate the bit time used in the distance computation in order to fit the bit time to the particular channel selected. The calculated distance value is sent to a digital range indicator (not shown) on the aircraft instrument panel.

Figure 12:
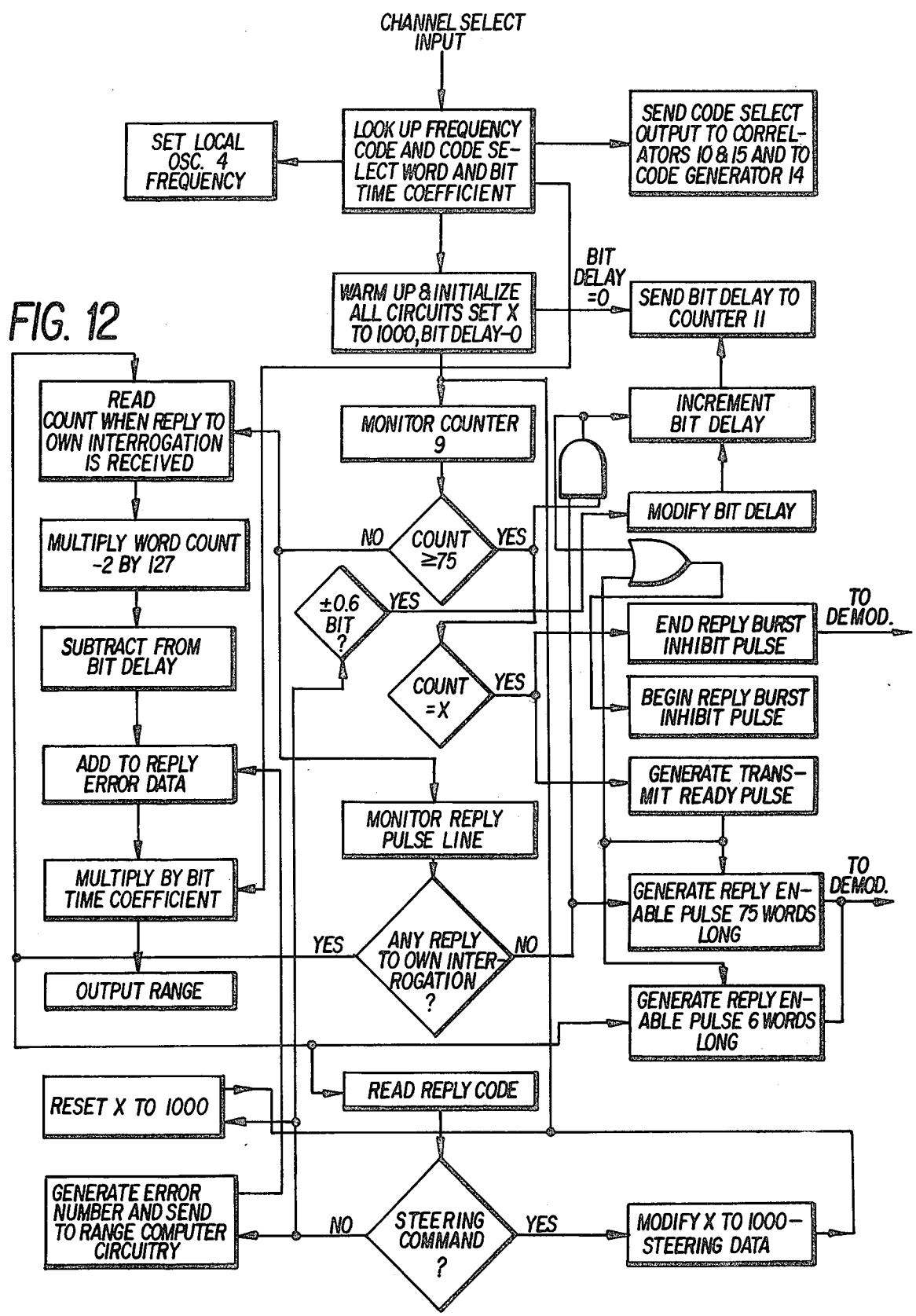
FIG. 12 illustrates in flow chart format the operations performed by an aircraft interrogator microprocessor.

FIG. 12 illustrates in flow chart format, the described functions performed by microprocessor 8. Both microprocessors 8 and 31 can be easily programmed to perform the functions required; the details of this programming being routine to one skilled in the art and are not otherwise illustrated.

Although the system has been described with particular reference to an embodiment incorporating a ground station and at least one aircraft, it should be apparent that the system can be utilized between any two communicating stations and that other changes in form and detail may be made to the system without departing from the spirit and scope of the invention, which is limited solely by the appended claims.

What is claimed:

1. A distance measuring apparatus for at least two communication stations comprising:
    means at a first station for transmitting a repeating bit pattern having a first predetermined number of bits, said repeating bit pattern forming a plurality of code words,
    means at at least one second station for receiving and locking onto said repeating bit pattern,
    means at said second station for transmitting an interrogation signal having a pedetermined bit pattern identical to and in synchronism with a predetemined code word in said received repeating bit pattern,
    means at said first station for receiving said interrogation signal and for determining whether said received interrogation signal is in synchronism with any code word in the repeating bit pattern transmitted by said first station and for transmitting a reply signal if synchronism within predetermined limits is achieved,
    means in said second station for monitoring said first station transmissions for said reply signal during a first predetermined time interval following transmission of an interrogation signal, and for causing said means for transmitting an interrogation signal to shift the time of transmission of a subsequent interrogation signal by a second predetermined number of bits relative to said predetermined code word if no reply signal is received during said first predetermined time interval, said means for monitoring causing said means for transmitting to shift the time of transmission of additional subsequent interrogations which have not been preceded by the receipt of a reply signal in said first predetermined time interval by additional predetermined numbers of bits,
    means in said second station for counting the number of bits which said transmitted interrogation signal was shifted before said reply signal was received,
    means in said second station for counting the number of whole word intervals in said received repeating code pattern existing between the transmission of an interrogation signal and the receipt of said reply signal, and
    means in said second station responsive to receipt of a reply signal for calculating the distance between said first and second station from said counted number of whole word intervals and said counted number of shifted bits.

2. A distance measuring apparatus as in claim 1 wherein said repeating code pattern is a pseudorandom code signal.

3. A distance measuring apparatus as in claim 1 further comprising:
    means at said first station for encoding an information signal on said reply signal.

4. A distance measuring apparatus as in claim 3 wherein said encoded information signal represents the sign and magnitude of the amount of residual synchronism error existing between said received interrogation and said work in the repeating bit pattern measured by said first station.

5. A distance measuring apparatus as in claim 3 wherein said encoded information signal represents a steering command instructing said second station to shift the time of its interrogation signalling by a predetermined number of whole word intervals.

6. A distance measuring apparatus as in claim 4 wherein said calculating means also utilizes said encoded informational signal representing a synchronism error in calculating the distance between said first station and said second station.

7. A distance measuring apparatus as in claim 4 further comprising:
    means at said second station responsive to a said encoded informational signal indicating a residual synchronism error greater than a predetermined amount for causing said means for transmitting an interrogation signal to advance or retard a subsequently transmitted interrogation signal by a third predetermined number of bits.

8. A distance measuring apparatus as in claim 5 further comprising:
    means at said second station responsive to a said steering command for altering the time of transmission of the interrogation signal by an amount specified in said steering command.

9. A distance measuring apparatus as in claim 1 wherein said reply signal is a predetermined number of bits long with each bit of said reply occupying a transmission time interval equal to the transmission time interval occupied by the first predetermined number of bits in said repeating bit pattern.

10. A distance measuring apparatus as in claim 5 wherein said steering command instructs said second station to advance its interrogation signal by one, ten or one-hundred whole word intervals.

11. A distance measuring apparatus as in claim 4 wherein said synchronism error is encoded in magnitudes of tenths of a bit.

12. A distance measuring apparatus as in claim 7 wherein said first predetermined number of bits satisfies the relationship $2^n - 1$ where n is an integer.

13. A distance measuring apparatus as in claim 7 wherein said predetermined amount is $\pm 0.6$ bit.

14. A distance measuring apparatus as in claim 9 wherein each bit of said reply signal occupies a transmission time interval equal to the length of a word in said repeating bit pattern.

15. A distance measuring apparatus as in claim 1 wherein said means for monitoring said first station transmissions for a valid reply causes said means for transmitting an interrogation signal to transmit its next interrogation signal delayed by one bit relative to said predetermined code word if no reply signal is received during said first predetermined time interval and for causing said means for transmitting to delay each successive interrogation which has not been preceded by the receipt of a reply signal in said first predetermined time interval by one additional bit.

16. A distance measuring apparatus as in claim 7 wherein said third predetermined number of bits is one.

17. A distance measuring method for at least two communication stations comprising the steps of:

transmitting a repeating bit pattern having a first predetermined number of bits from a first station, said repeating bit pattern forming a plurality of code words, receiving and locking onto said repeating bit pattern at at least one second station, transmitting from said second station an interrogation signal having a predetermined bit pattern in synchronism with a predetermined code word in said received repeating bit pattern, receiving said interrogation signal at said first station and determining whether said received interrogation signal is in synchronism within predetermined limits with any code word in the repeating bit pattern transmitted by said first station and transmitting a reply signal if synchronism is achieved, monitoring at said second station said first station transmissions for said reply signal during a first predetermined time interval following transmission of an interrogation signal, and shifting the transmission time of a subsequent interrogation signal by a second predetermined number of bits relative to said predetermined code word if no reply signal is received during said first predetermined time interval, and for shifting the transmission time of subsequently transmitted interrogation signals relative to said predetermined code word which have not been preceded by the receipt of a reply signal in said first predetermined time interval by additional predetermined numbers of bits, counting at said second station the number of bits of shifting imparted to said transmitted interrogation signal, counting at said second station the number of whole word intervals occurring in said received repeating code pattern between the transmission of an interrogation signal and the receipt of said reply signal, and calculating the distance between said first and second station from said counted number of whole word intervals and said counted number of shifted bits.

18. A distance measuring method as in claim 1 further comprising the step of:

encoding an information signal on said reply signal.

19. A distance measuring method as in claim 18 wherein said encoded information signal represents the sign and magnitude of a residual synchronism error existing between said received interrogation and said word in the repeating bit pattern measured by said first station.

20. A distance measuring method as in claim 18 wherein said encoded information signal represents a steering command instructing said second station to alter the time of its interrogation signalling by a predetermined number of whole word intervals.

21. A distance measuring method as in claim 19 wherein said calculating step utilizes the amount of synchronism error encoded on said reply signal in calculating the distance between said first station and said second station.

22. A distance measuring method as in claim 19 further comprising the steps of:

shifting an interrogation signal by a predetermined number of bits following receipt at said second station of a reply signal encoded with synchronism error information which is greater than a predetermined amount.

23. A distance measuring method as in claim 20 further comprising the step of:

shifting the time of transmission of an interrogation signal following receipt of a reply encoded with steering command information by an amount specified in said steering command.

* * * * *